United States Patent [19]

Buckland

[11] Patent Number: 5,822,330
[45] Date of Patent: Oct. 13, 1998

[54] METHOD AND SYSTEM FOR DYNAMICALLY ADJUSTING SIGNAL SKEWING

[75] Inventor: Patrick Allen Buckland, Austin, Tex.

[73] Assignee: International Business Machines Corp., Armonk, N.Y.

[21] Appl. No.: 635,341

[22] Filed: Apr. 19, 1996

[51] Int. Cl.[6] .............................. G06F 11/00; G06K 5/04; G11B 5/00

[52] U.S. Cl. .............................. 371/1; 395/558; 395/559; 375/254

[58] Field of Search ................................ 371/1, 47.1, 62, 371/61, 64, 27; 395/558, 551, 552, 553, 556, 559; 364/572, 574, 944.91, 945.8; 375/362, 371, 254, 364, 214

[56] References Cited

U.S. PATENT DOCUMENTS

| | | | |
|---|---|---|---|
| 4,007,329 | 2/1977 | McClain et al. | 375/356 |
| 4,550,405 | 10/1985 | West | 371/1 |
| 4,839,907 | 6/1989 | Saneski | 375/364 |
| 5,032,743 | 7/1991 | Rogers | 371/1 |
| 5,068,785 | 11/1991 | Sugiyama | 395/285 |
| 5,081,646 | 1/1992 | Faunce | 375/214 |
| 5,121,262 | 6/1992 | Squires et al. | 360/46 |
| 5,206,946 | 4/1993 | Brunk | 395/500 |
| 5,255,383 | 10/1993 | Lewis et al. | 711/112 |
| 5,261,058 | 11/1993 | Squires et al. | 395/821 |
| 5,265,038 | 11/1993 | Kwok | 364/572 |
| 5,274,773 | 12/1993 | Squires et al. | 395/858 |
| 5,287,462 | 2/1994 | Jibbe et al. | 395/856 |
| 5,337,413 | 8/1994 | Lui et al. | 395/822 |
| 5,400,360 | 3/1995 | Richards et al. | 375/214 |
| 5,412,666 | 5/1995 | Squires et al. | 371/37.4 |
| 5,416,918 | 5/1995 | Gleason et al. | 395/556 |
| 5,467,464 | 11/1995 | Oprescu et al. | 395/556 |
| 5,481,675 | 1/1996 | Kapogiannis et al. | 395/200.65 |
| 5,509,038 | 4/1996 | Zlicki | 375/371 |
| 5,579,352 | 11/1996 | Llewllyn | 371/1 |

FOREIGN PATENT DOCUMENTS

| | | |
|---|---|---|
| 6-291749 | 10/1994 | Japan . |
| 7-152682 | 6/1995 | Japan . |
| 7-295925 | 11/1995 | Japan . |

*Primary Examiner*—Trinh L. Tu
*Attorney, Agent, or Firm*—Richard A. Henkler

[57] ABSTRACT

As SCSI systems increase in size, especially where there are a plurality of physically separate components, cables are often used to connect various components of the system, such as drives, to one another via repeaters and convertors. Unfortunately, as the length of the connecting cable increases, the cable in combination with the repeaters and convertors skew the signals and data passed between the components. A method and system is presented that reclocks the skewed data and signals so as to compensate for the skewing. The method and system accomplishes this task dynamically for Fast and Fast 20 modes of operation of the SCSI bus.

13 Claims, 4 Drawing Sheets

METHOD AND SYSTEM FOR DYNAMICALLY ADJUSTING SIGNAL SKEWING

A portion of the disclosure of this patent document contains material which is subject to copyright protection. The copyright owner has no objection to the facsimile reproduction by anyone of the patent disclosure, as it appears in the Patent and Trademark office patent files or records, but otherwise reserves all copyright rights whatsoever.

BACKGROUND

1. Field of the Present Invention

The present invention generally relates to signal compensations and more specifically, to dynamically adjusting signals to compensate for skewing thereof.

2. History of Related Art

The SCSI bus is used by many producers of computer systems. This is especially true of larger systems where multiple boxes or components are used. The SCSI bus is currently defined as operating at one of four frequencies each of which have corresponding overall length limitations for the bus. The four frequencies and their associated recommended length limitations are as follows:

(1) Base SCSI Asynchronous at 0–3 MHZ for a total distance of six meters (this mode is used for all command and status data even when the data uses synchronous data transfers);

(2) Synchronous at 1–5 MHZ for a total distance of six meters;

(3) Fast Synchronous at 5–10 MHZ for a total distance of three meters; and (4) Fast 20 Synchronous at 10–20 MHZ for a total distance of 1.5 meters.

Exceeding the length limitations results in signal degradation. Often Repeaters or Converters are used to overcome the degradation. However, the use of Repeaters or Converters adds skewing to the signals which results in errors and unreliability in the transfer of the data during synchronous mode.

It would, therefore, be a distinct advantage to have a method and system that would overcome the length limitations imposed by the SCSI bus while maintaining reliability. The present inventions provides such a method and system.

SUMMARY OF THE PRESENT INVENTION

The present invention is a method and system that compensates for SCSI signals that are skewed due to exceeding the recommended length limitations of the bus. The method and system accomplishes this task without specific knowledge of the contents of the signals or their current speed of transfer, and dynamically adjusts to changes in the speeds of the bus.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
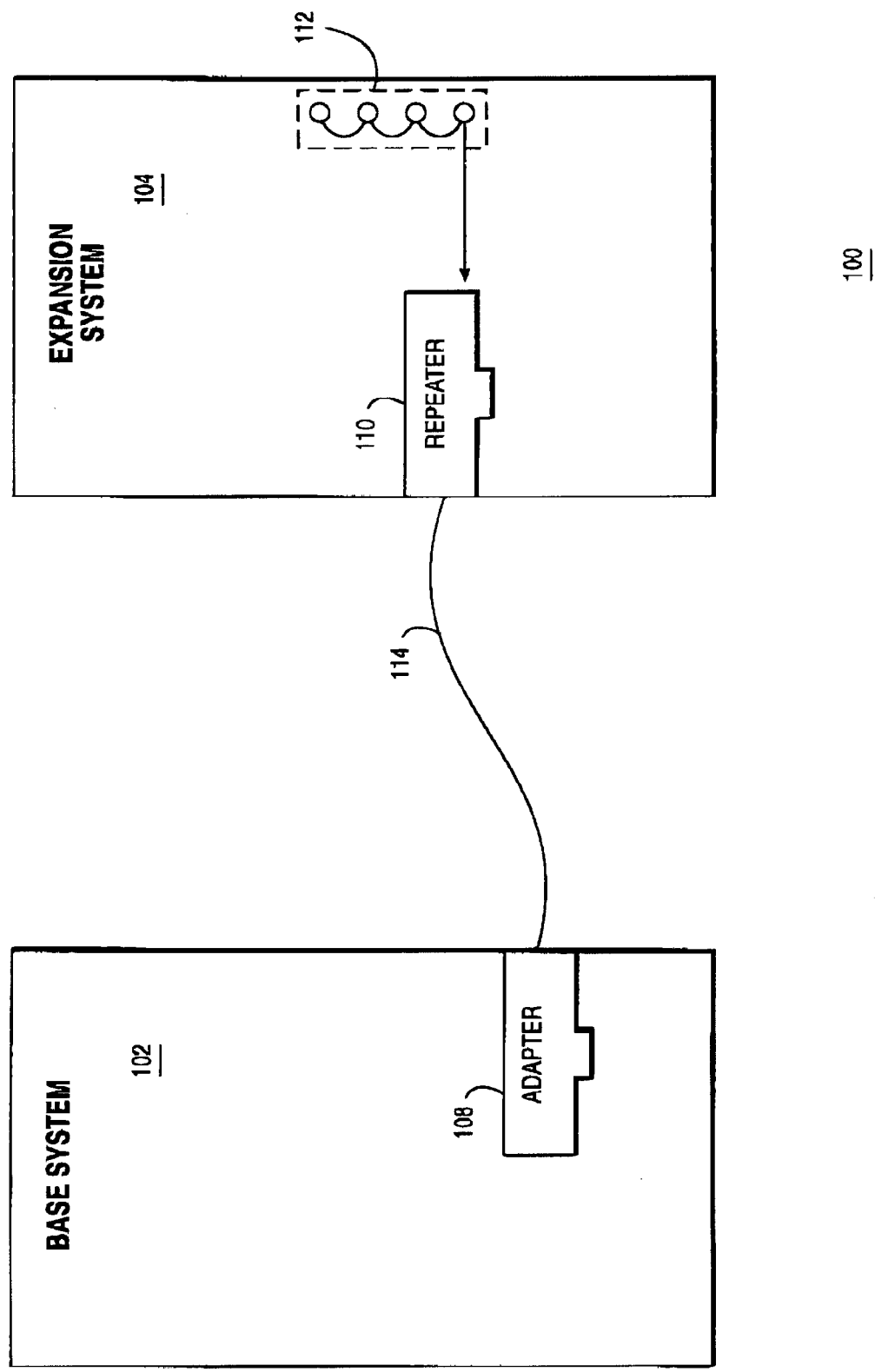
FIG. 1 is a schematic diagram of an apparatus in which the present invention can be practiced.

Reference now being made to FIG. 1, a schematic diagram of an apparatus 100 in which the present invention can be practiced is shown. Apparatus 100 includes a base system 102 and an expansion system 104. The Expansion System 104 may be, for example, an RS/6000 7027 Disk Drive Drawer manufactured by International Business Machines. The base system 102 includes Adapter 108, for communicating with SCSI drives 112, which are connected to Repeater 110 via cable 114. Repeater 110 communicates with other components of the expansion system 104, and the SCSI drives via a single SCSI Bus 116. Currently, the industry is operating the SCSI bus at the following four speeds:

(1) Base SCSI asynchronous at 0–3 MHZ for a distance of six meters (this mode is used for all command and status data even when the data uses synchronous data transfer);

(2) Synchronous at 1–5 MHZ for a distance of six meters;

(3) Fast synchronous at 5–10 MHZ for a distance of 3 meters; and (4) Fast 20 synchronous at 10–20 MHZ for a distance of 1.5 meters.

Exceeding any of the above noted lengths for the corresponding speed results in degradation of the signal. It is typical to use Repeaters or Converters to compensate such signal degradation. However, the use of Repeaters or Converters in this circumstance introduces the additional problem of skewing the signal. The present invention provides a relatively inexpensive method and system for overcoming the length limitations by elimination of the above noted skewing problem. For example, apparatus 100 has a total cable length of 7.5 meters (6 m between and 1.5 m connecting to the SCSI Bus) and supports all four speeds. It can be assumed hereinafter that Adapter 108 and Repeater 110 are both single ended. However, this is not to be interpreted as a limitation with respect to the present invention. Specifically, Adapter 108 can be, for example, differential ended. Correspondingly, Repeater 110 could be replaced with a Converter for receiving signals from Adapter 108 that are either single ended or differential ended, and converting those signals to single ended or differential. (i.e. (1) single ended to single ended; (2) single ended to differential ended; (3) differential ended to single ended; or (4) differential ended to differential ended). In yet another example where Adapter 108 is differential ended and Repeater 110 is replaced with a Converter, the cable length can be extended to 26.5 meters (25 meters for cable 114 and 1.5 meters internally) according to the teachings of the present invention.

Figure 2:
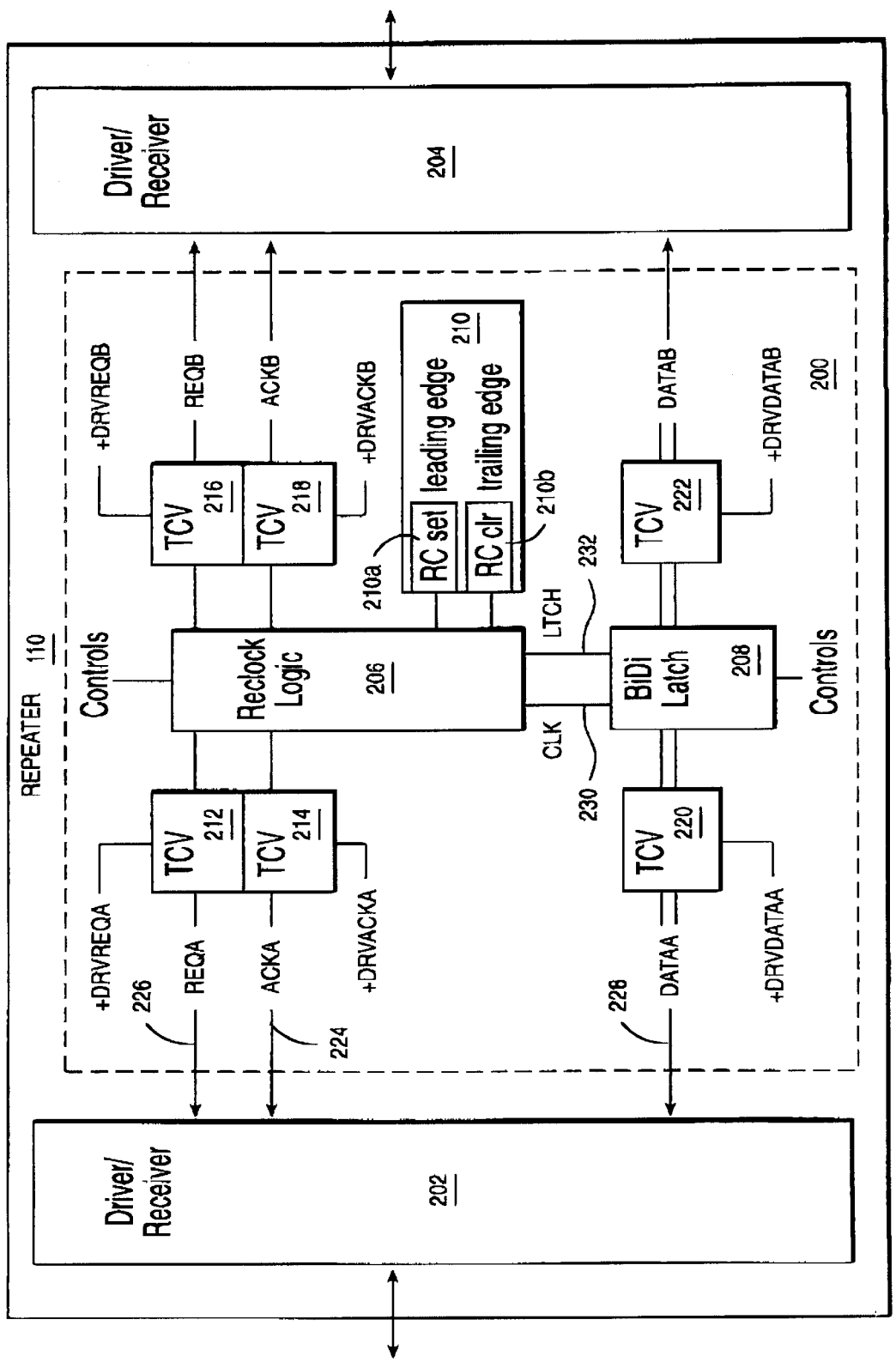
FIG. 2 is a schematic diagram illustrating in greater detail the Repeater of FIG. 1 according to the teachings of the present invention.

Reference now being made to FIG. 2, a schematic diagram is shown illustrating in greater detail the Repeater 110 of FIG. 1 according to the teachings of the present invention. Repeater 110 includes a Reclocking Circuit 200, and Driver/Receivers 202 and 204. In general terms, the Reclocking Circuit 200 rebuilds the signals transmitted from the Base System 102 (i.e. compensates for skewing due to cable length) via cable 114. The Reclocking Circuit 200 includes a plurality of transceivers 212, 214, 216, 218, 220, and 222; each of which are used for either driving or receiving data/signals via their respective lines. In this particular instance, transceivers 214 and 218 drive/receive Acknowledge line 224, transceivers 212 and 216 drive/receive Request line 226, and transceivers 220 and 222 drive/receive data line 228. The Reclocking Circuit 200 also includes Reclock Logic 206, Bi-Directional Latch 208, and Delay Circuit 210. Bi-Directional Latch 208 controls the latching of the data received via data line 228. It should be noted and those of ordinary skill in the art will readily recognize that two LSD latches could be used instead of Bi-directional latch 208. In the preferred embodiment of the present invention, Bi-Directional Latch 208 is an IC model 74ABT16500 produced by Texas Instruments, and Reclock Logic 206 is a Programmable Logic Device model 22V10-7 produced by Advanced Micro Devices. The code for programming Reclock Logic 206 is attached hereto as Appendix A.

Delay circuit 210 includes two RC (Resistor/Capacitor) delay circuits 210a (RC Set) and 210b (RC CLR). RC set 210a and RC clear 210b are used for generating the rising and falling edges of a Request or Acknowledge signal, respectively for the receiving Driver/Receiver 204 or 208. The RC set 210a and RC clear 210b are preferably constructed from one percent tolerant resistors and two percent tolerant capacitors. The use of these high tolerant resistors and capacitors promotes consistency between the RC set 210a and the RC clear 210b. More specific information concerning the Reclock logic 206 and the Bi-Directional Latch 208 is explained in connection with FIGS. 3 and 4.

Figure 3:
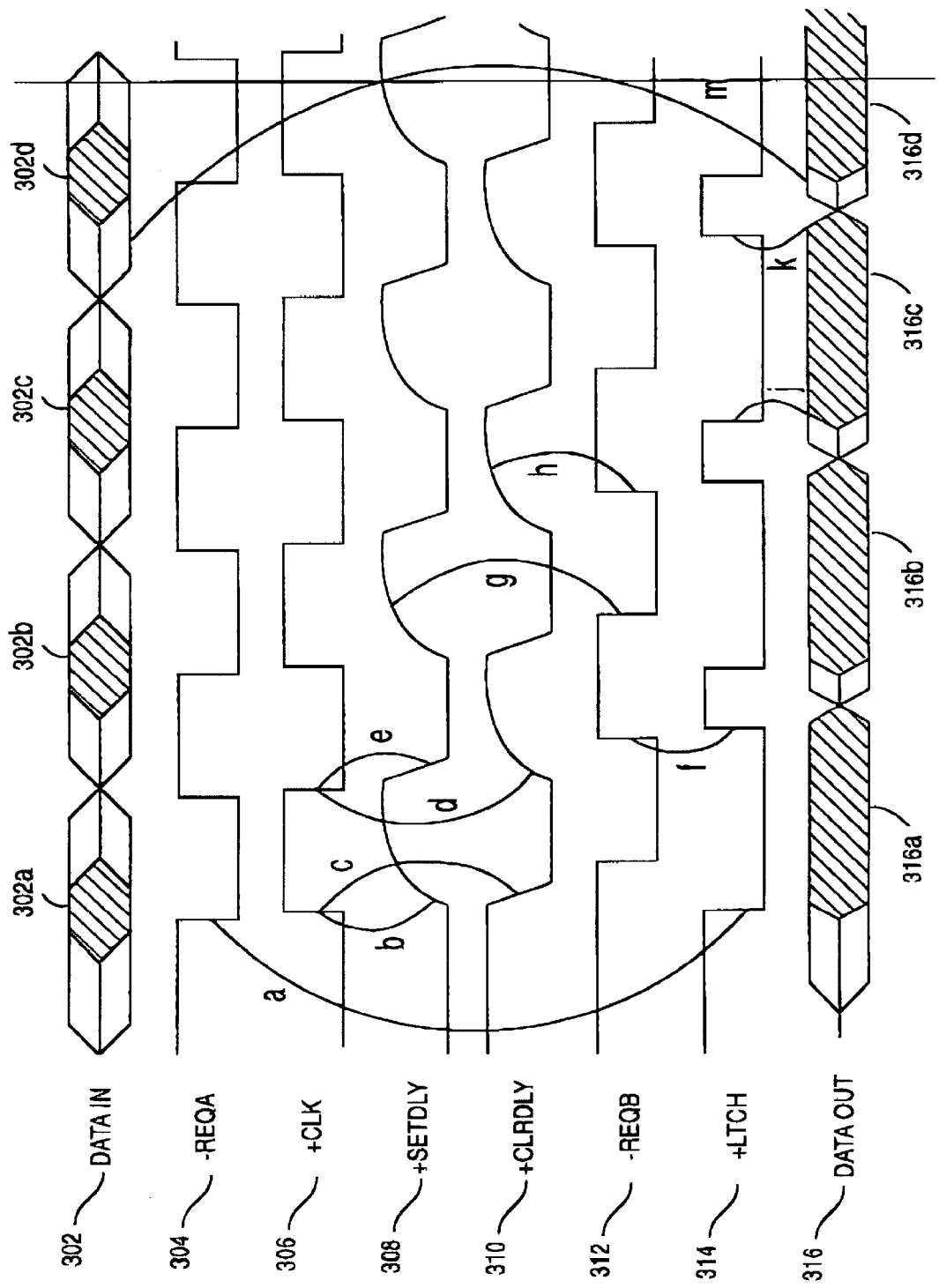
FIG. 3 is a timing diagram of various signals that are received and generated by the Reclocking circuit of FIG. 2 during Fast mode according to the teachings of the present invention.

Reference now being made to FIG. 3, a timing diagram of various signals that are received and generated by the Reclocking Circuit 200 of FIG. 2 is illustrated according to the teachings of the present invention. The timing diagram illustrated in FIG. 3 assumes that the Reclocking Circuit 200 is receiving and transmitting data within the 10–15 megahertz range (fast). It can also be assumed, in this example, that data is being received by Driver Receiver 202 and transmitted to Driver/Receiver 204 via Reclocking Circuit 200. Consequently, Request Line 226 (FIG. 2) is being driven by Driver/Receiver 202 as shown by Request A signal 304 (-REQA). Further, data as represented by Data In signal 302 is being transmitted via Data Line 228. It should be noted that portions of data can be transmitted during each period of Request A Signal 304. However, data is only guaranteed as being valid upon the falling edge of the Request A Signal 304 as indicated by designations 302a–d.

The clock signal 306 is generated by the reclock logic 206 from inverting the Request A signal 304. The RC set 210a and RC clear 210b circuits generate the Set delay signal 308 (+SETDLY) and the clear Delay signal 310(CLRDLY), respectively. As noted by designations b and e (FIG. 3), the positive pulse of CLK signal 306 is used to charge RC set 210a. As noted by designation d, the negative pulse of the CLK signal 306 is used for charging RC clear 210b. As noted from the SETDLY 308 and CLRDLY 310 signals, the charge and discharge times for either of the RC set 210a or RC clear 210b circuits is not proportional. Consequently, the rise times for the RC set and RC clear circuits 210a and 210b are used for generating the request B signal 312. Thus, in order to generate the REQB signal 312 therefrom, the RC set 210a and RC clear 210b circuits are used in combination. Specifically, a TTL threshold level is used on the rise times of the SETDLY 308 and CLRDLY 310 signals illustrated by designations g and h (FIG. 3). The Latch Signal 314 (+LTCH) is used for guaranteeing a time in which the data being transmitted on data line 228 (FIG. 2) is valid. As noted in FIG. 2, the LTCH signal 314 guarantees longer valid data times as shown by designation 316a–d. This results from the signal 314 going to an active high state whenever both the REQA 304 signal and REQB signal 312 are inactive (i.e. High). During this time period, Data In signal 302 is transparently fed as the Data Out signal 316.

Figure 4:
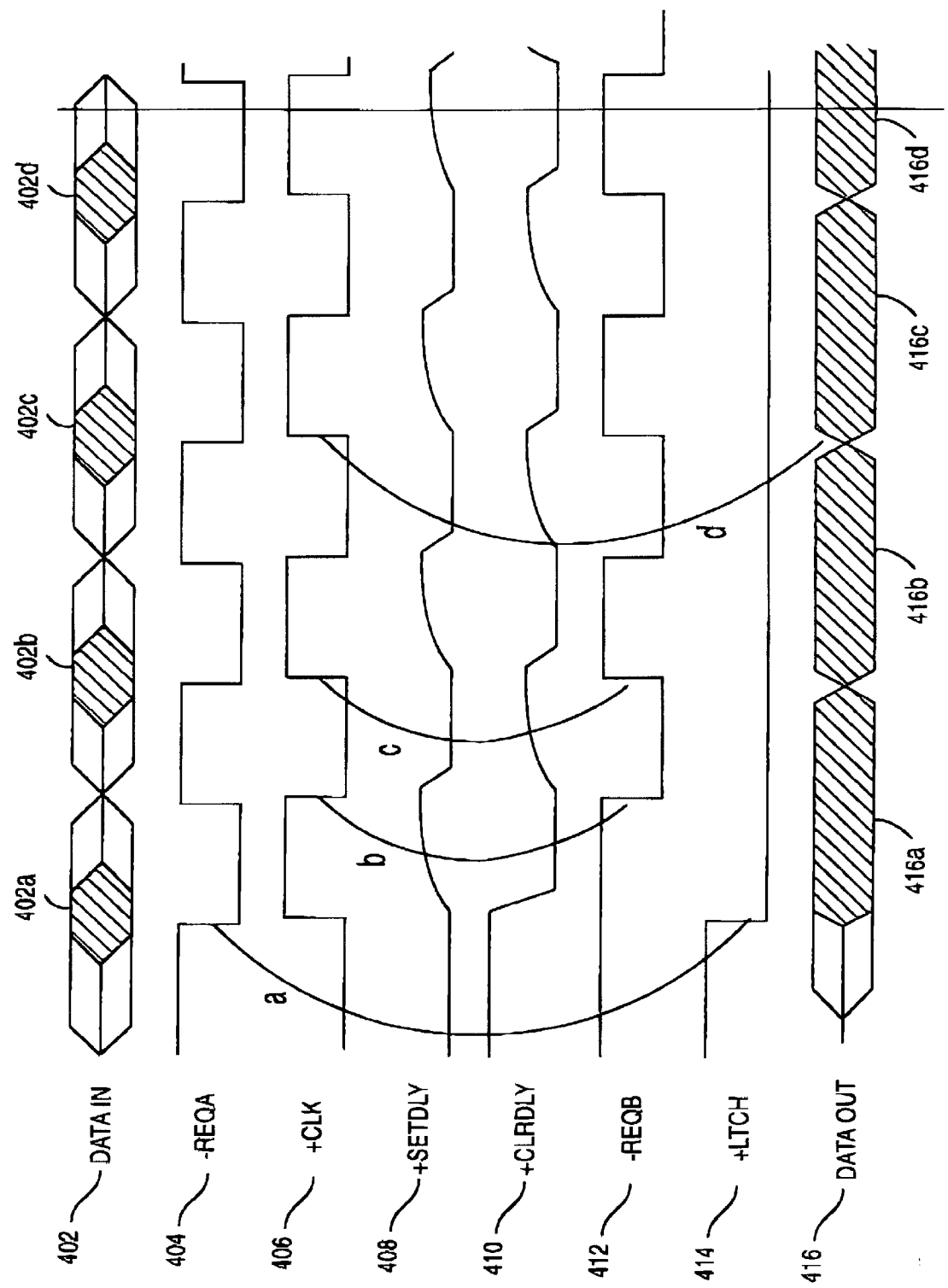
FIG. 4 is a timing diagram of various signals that are received and generated by the Reclocking Circuit of FIG. 2 during Fast 20 mode according to the teachings of the present invention.

Reference now being made to FIG. 4, a timing diagram of various signals that are received and generated by the Reclocking Circuit 200 during Fast 20 mode is shown according to the teachings of the present invention. As previously described in connection with FIG. 3, the signals Data In, REQA 404, CLK 406, SETDLY 408, CLRDY 410, REQB 412, and LTCH 414, are produced in the same manner. During Fast 20 mode operation, however, the REQB 412 and Data Out 416 signals are generated in a different fashion from Fast Mode. More specifically, REQB 412 signal is no longer generated from the SETDLY 408 and CLRDLY 410 signals, but instead is created from inverting the REQA 404 signal. This change is necessitated from the reality that the RC set 210a and RC CLR 210b circuits are no longer given a sufficient amount of time to charge to a TTL threshold level. The Reclock logic 206 (FIG. 2) recognizes this and informs the Bi-Directional Latch 208 to latch the out going data on the falling edge of CLK 406 signal as indicated by designation d (FIG. 4).

As a direct result of detecting the FAST 20 mode, the Reclock Logic 206 no longer transmits a LTCH signal 414. As described, the present invention provides a method and system for reclocking signals request and acknowledge signals in the data associated therewith from asynchronous transmission via Reclocking Circuit 200. As noted in the example of FIGS. 3 and 4, depending on who the initiator is and the I/O signal the clock signal (+CLK) can be generated from the Request line 226 or the Acknowledge line 224.

The Reclocking Circuit 200 as shown in FIGS. 3 and 4 allows seamless transitions between Fast and Fast 20 modes. The circuit is relatively inexpensive and does not required special parsing or other logic to determine the speed of the bus.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

APPENDIX A

CHIP   DITLTCH   PAL22V10

```
;- - - -DIP- - - - - PIN Declarations - - - - -PLCC- - - - - - - - - - - -
PIN  1         IOA        ;  2            ; INPUT
PIN  2         IOB        ;  3            ; INPUT
PIN  3         /GATE2     ;  4            ; INPUT
PIN  4         ENACNTL    ;  5            ; INPUT
PIN  5         ENBCNTL    ;  6            ; INPUT
PIN  6         CD         ;  7            ; INPUT
PIN  7         MSG        ;  9            ; INPUT
PIN  8         NC         ;  10           ; INPUT
PIN  9         NC         ;  11           ; INPUT
PIN  10        NC         ;  12           ; INPUT
PIN  11        NC         ;  13           ; INPUT
;GND 12        GND           14             GND
PIN  13        OE         ;  16           ; INPUT
PIN  14        REQA       ;  17           ; IO
PIN  15        REQB       ;  18           ; IO
PIN  16        ACKA       ;  19           ; IO
PIN  17        ACKB       ;  20           ; IO
PIN  18        NC         ;  21           ; IO
PIN  19        LTCH       ;  23           ; IO
PIN  20        /CLKOUT    ;  25           ; IO
PIN  21        NC         ;  25           ; IO
PIN  22        SETDLY     ;  26           ; IO
PIN  23        CLRDLY     ;  27           ; IO
;VCC 24        VCC           28             VCC ;- - - - - - - - - - - - - - - - - - - - - - - - - - - Boolean Equation Segment - - - - - -
EQUATIONS CLKOUT = ACKB   * ENBCNTL  * /IOA * GATE2   ; AINIT B TO A
       + REQA   * ENBCNTL  *  IOA * GATE2   ; AINIT A TO B
       + REQB   * ENACNTL  *  IOB * GATE2   ; AINIT B TO A
       + ACKA   * ENACNTL  * /IOB * GATE2   ; AINIT A TO B
CLKOUT.TRST = OE

/SETDLY = VCC
SETDLY.TRST = /CLKOUT * OE   ; DRIVE LOW IF NO REQ/ACK

/CLRDLY = VCC
CLRDLY.TRST = CLKOUT * OE    ; DRIVE LOW IF REQ/ACK

LTCH   = /ACKA * /ACKB * /IOA * CLRDLY ; NORMAL / SLOW
       + /REQA * /REQB *  IOA * CLRDLY ; NORMAL / SLOW
LTCH.TRST = OE

REQB =  SETDLY *          IOA ;  10 MHZ OR SLOWER DATAPHASE
      + /REQA  * /CLRDLY * IOA ;  FAST OR SLOW HOLD
      + REQA   * /IOA          ; NOT IN DATA PATH
REQB.TRST = ENBCNTL * OE

REQA =  SETDLY *          IOB ;  10 MHZ OR SLOWER DATAPHASE
      + /REQB  * /CLRDLY * IOB ;  FAST OR SLOW HOLD
      + REQB   * /IOB          ; NOT IN DATA PATH
REQA.TRST = ENACNTL * OE

ACKB =  SETDLY *         /IOB ;  10 MHZ OR SLOWER DATAPHASE
      + /ACKA  * /CLRDLY * /IOB ;  FAST OR SLOW HOLD
      + ACKA   *  IOB          ; NOT IN DATA PATH
ACKB.TRST = ENACNTL * OE

ACKA =  SETDLY *         /IOA ;  10 MHZ OR SLOWER DATAPHASE
      + /ACKB  * /CLRDLY * /IOA ;  FAST OR SLOW HOLD
      + ACKB   *  IOA          ; NOT IN DATA PATH
ACKA.TRST = ENBCNTL * OE
```

© 1996 International Buisness Machines

What is claimed is:

1. An apparatus for reducing the skewing of received digital signals, the apparatus comprising:

receiving means for receiving a data signal and a communication signal, the communication signal being skewed with respect to the data signal;

means for inverting the received communication signal to create a clock signal;

a set circuit for generating the rising edge of a new communication signal from the clock signal;

a clear circuit for generating the falling edge of the new communication signal from the clock signal;

means for generating a latch signal that is active during the periods of time in which the received communication signal and new communication signal are both active high; and means for latching the data signal with the falling edge of the latch signal.

2. The apparatus of claim 1 wherein the set circuit includes:

a resistor and a capacitor that are charged during the rising edge of the clock signal.

3. The apparatus of claim 2 wherein the clear circuit includes:

a resistor and a capacitor that are charged during the falling edge of the clock signal.

4. The apparatus of claim 3 wherein the set circuit includes:

means for generating the rising edge of the new communication signal from the clock signal when the set circuit has charged to a predetermined voltage level.

5. The apparatus of claim 4 wherein the clear circuit includes:

means for generating the falling edge of the new communication signal from the clock signal when the clear circuit has charged to the predetermined voltage level.

6. The apparatus of claim 5 further comprising:

means for creating the new communication signal from the clock signal when the set and clear circuits fail to charge to the predetermined voltage level.

7. A method of reducing the skewing of received digital signals, the method comprising the steps of:

receiving a data signal and a communication signal, the communication signal being skewed with respect to the data signal;

inverting the received communication signal to create a clock signal;

generating, with a set circuit, the rising edge of a new communication signal from the clock signal; and generating, with a clear circuit, the falling edge of the new communication signal from the clock signal; and generating a latch signal that is active during the periods of time in which the received communication signal and new communication signal are both active high; and latching the data signal with the falling edge of the latch signal.

8. The method of claim 7 wherein the set circuit includes a resistor and a capacitor that are charged during the rising edge of the clock signal.

9. The method of claim 8 wherein the clear circuit includes a resistor and a capacitor that are charged during the falling edge of the clock signal.

10. The method of claim 9 wherein the step of generating, with a set circuit, the rising edge, includes the step of:

generating, with the set circuit, the rising edge of a new communication signal from the clock signal when the set circuit has charged to a predetermined voltage level.

11. The method of claim 10 wherein the step of generating, with a clear circuit, the falling edge, includes the step of:

generating, with the clear circuit, the falling edge of the new communication signal from the clock signal when the clear circuit has charged to the predetermined voltage level.

12. The method of claim 11 further includes the step of:
creating the new communication signal from the clock signal when the set and clear circuits fail to charge to the predetermined voltage level.

13. A repeater for reducing the skewing of digital signals received by a transmission line from a first unit to a second unit, the repeater comprising:

a receiver for receiving digital signals on a transmission line, the digital signals including a communication signal and a data signal, the communication signal being skewed with respect to the data signal;

reclocking logic, coupled to the receiver, for reducing the skew of the communication signal, the reclocking logic including:

means for inverting the received communication signal to create a clock signal;

a set circuit, having a resistor and a capacitor, for creating a delay signal, the set circuit charging during the rising edge of the clock signal;

a clear circuit, having a resistor and a capacitor circuit for creating a clear delay signal, the clear circuit charging during the falling edge of the clock signal;

means for creating a modified communication signal from the delay and clear delay signals when the set and clear circuits have charged to a predetermined voltage, or from the clock signal when the set and clear circuits fail to charge to the predetermined voltage;

means for creating a latch signal that is active during the periods of time in which the received communication signal and modified communication signal are both active;

means for latching the data signal, the latching means including:

means for latching the data signal with the rising edge of the active latch signal when the modified communication signal is created from the set and clear circuits; and means for latching the data signal with the falling edge of the clock signal when the modified communication signal is created from the clock signal; and a driver for driving the latched data signal and the modified communication signal on a bus.

* * * * *